United States Patent [19]
Trondsen

[11] 3,980,231
[45] Sept. 14, 1976

[54] PROPORTIONING SPRAYER DEVICE

[75] Inventor: John M. Trondsen, Seattle, Wash.

[73] Assignee: Eastside Spraying Service Inc., Kirkland, Wash.

[22] Filed: Apr. 24, 1975

[21] Appl. No.: 571,439

[52] U.S. Cl. .............................. 239/61; 239/310; 137/99; 222/134
[51] Int. Cl.² .......................................... B05B 7/26
[58] Field of Search ............. 239/61, 310; 222/134; 137/99

[56] References Cited
UNITED STATES PATENTS

| | | | |
|---|---|---|---|
| 2,887,094 | 5/1959 | Krukemeier | 137/99 X |
| 2,954,737 | 10/1960 | Hoover | 137/99 X |
| 3,710,982 | 1/1973 | Ferrari | 222/134 |
| 3,765,605 | 10/1973 | Gusner | 239/61 |
| 3,815,621 | 6/1974 | Robinson | 137/99 |
| 3,865,308 | 2/1975 | Pringle et al. | 239/61 |

Primary Examiner—John J. Love
Attorney, Agent, or Firm—Seed, Berry, Vernon & Baynham

[57] ABSTRACT

A reciprocating, double-acting cylinder pump supplies high-pressure water to a spray nozzle. A reciprocating, double-acting insecticide pump is mechanically and adjustably slaved to the water pump piston rod and discharges into the water line to provide an accurate, proportionate amount of insecticide to the water at the discharge nozzle. Control of the flow of water and insecticide occurs at the nozzle.

5 Claims, 6 Drawing Figures

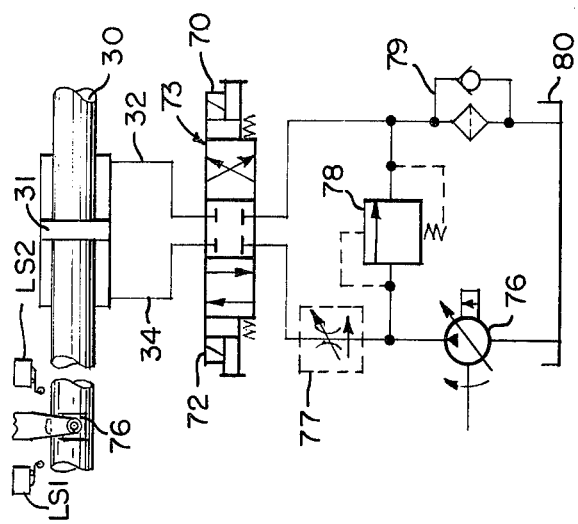
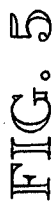
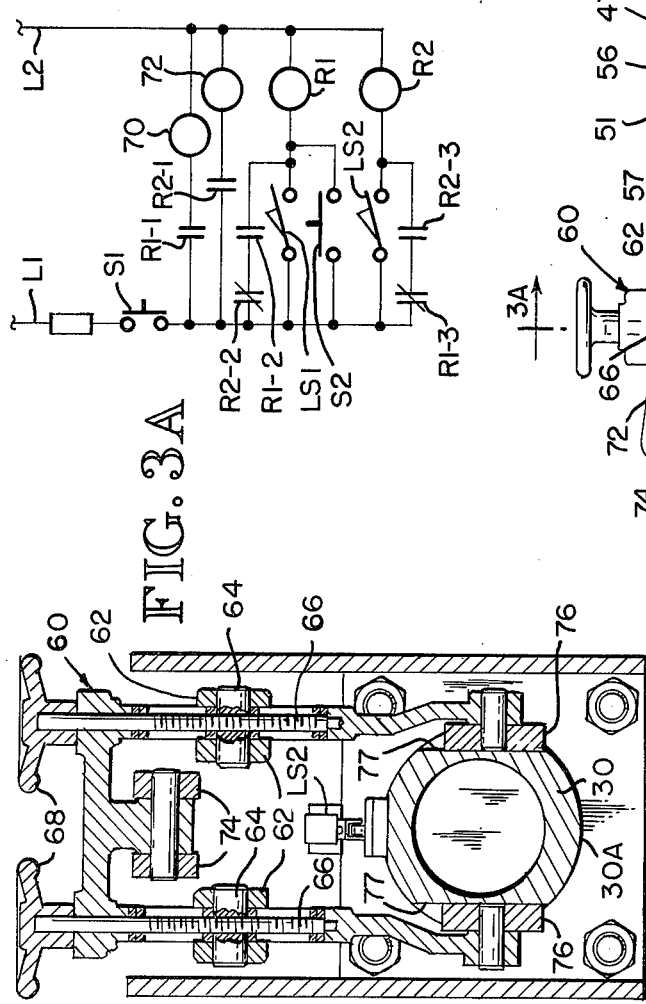
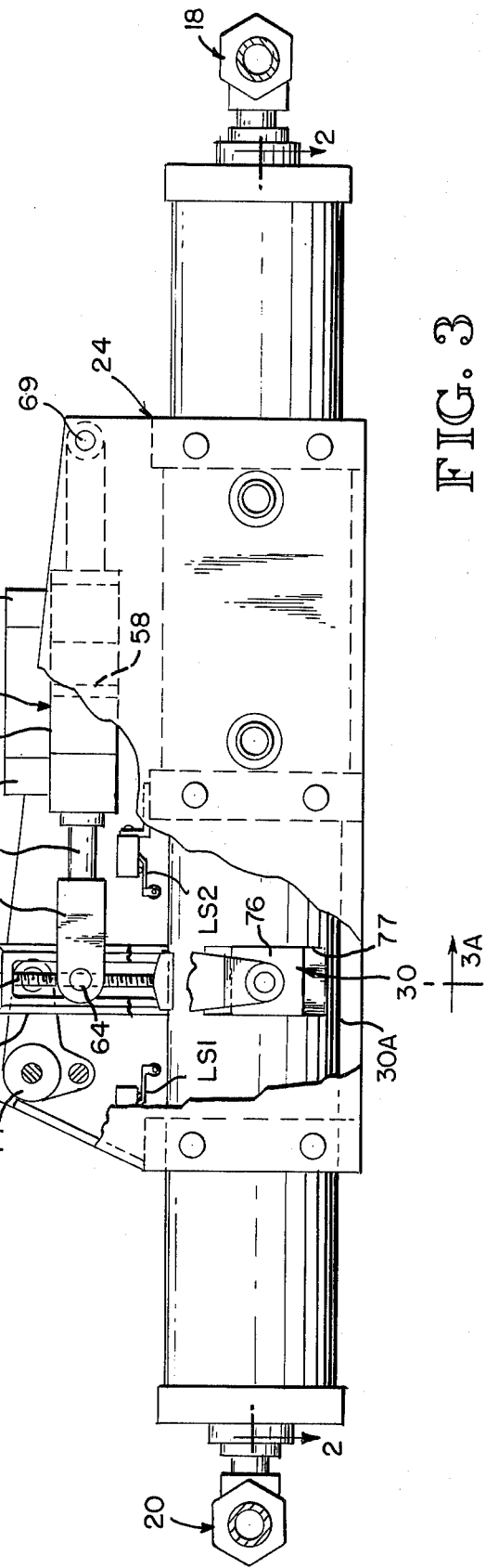

3,980,231

PROPORTIONING SPRAYER DEVICE

BACKGROUND OF THE INVENTION

1. Field of the Invention

This invention pertains to sprayers, particularly high-pressure, vehicle powered insecticide sprayers in which a fluid additive, such as an insecticide, is accurately added to a high-pressure water flow at the nozzle of the sprayer.

2. Description of the Prior Art

For many years, sprayers for controlling weeds or insects, both in agricultural areas and in urban areas, have used bulk spray units in which a large tank of premixed spray is dispensed by truck or airplane over the infected area. That procedure presents problems in shelf life of the mixed spray as well as adverse environmental damage when the spray is disposed of.

An improved technique for spraying has been developed in which the additive fluid, such as an insecticide, is metered into the water just upstream of the spray nozzle. In this technique, the spray solution is not premixed in bulk, resulting in minimal wastage and eliminating need for dumping or disposing of the toxic additive fluid. It is difficult, however, in high-pressure spraying equipment, such as at a water pressure of 800 psi, to obtain accurate proportioning of the additive fluid into the water during all phases of operation of the sprayer. One suitable apparatus is illustrated in U.S. Pat. No. 3,865,308. The apparatus of that patent application, however, is extremely expensive to manufacture and maintain and thus has limited market potential.

SUMMARY OF THE INVENTION

It is an object of this invention to provide a spray proportioning device in which the additive fluid is added to the water at the nozzle in an accurate manner.

It is another object of this invention to provide a sprayer proportioning device which is inexpensive to manufacture and maintain.

It is still another object of this invention to provide a sprayer proportioning device which is accurately controlled at the spray nozzle.

Basically, these objects are obtained by providing a reciprocating main fluid piston-cylinder assembly and a reciprocating additive fluid piston-cylinder assembly. The additive fluid piston-cylinder assembly is mechanically and adjustably slaved to the main piston-cylinder assembly for providing accurate metering of the additive fluid into the water. The outlets from the two cylinders are connected in a turbulence or mixing chamber just upstream of the spray nozzle. The main power supply for reciprocating the main piston-cylinder assembly is preferably a pressure-compensated, variable, positive displacement hydraulic pump which senses the back pressure from the control of the nozzle to place the entire system into a passive condition when fluid is not being sprayed. Other types of pumps with suitable pressure relief valves may suffice.

As is readily apparent, the reciprocating piston-cylinder assemblies are able to be accurately regulated one to the other so that very accurate proportioning of the water and additive can be obtained. Furthermore, since reciprocating pistons are used, the flow can be varied or reduced during shutdown and start-up without substantially deviating from the desired proportions. Essentially, the invention is a demand system operable at high volumes and pressures and which can be left idle for long periods with adjustable, accurately proportioned mixing at start-up, shutdown and during spraying.

BRIEF DESCRIPTION OF THE FIGURES OF THE DRAWING

FIG. 3 is a side elevation of the proportioning device shown in FIG. 1 with parts broken away for clarity.

FIG. 3A is a vertical section taken along line 3A—3A of FIG. 3.

FIG. 4 is a typical wiring circuit for controlling operation of the spraying device and FIG. 5 is a typical hydraulic schematic illustrating the drive mechanism for reciprocating the piston-cylinder assembly shown in FIG. 1.

DESCRIPTION OF THE PREFERRED EMBODIMENTS

Figure 1:
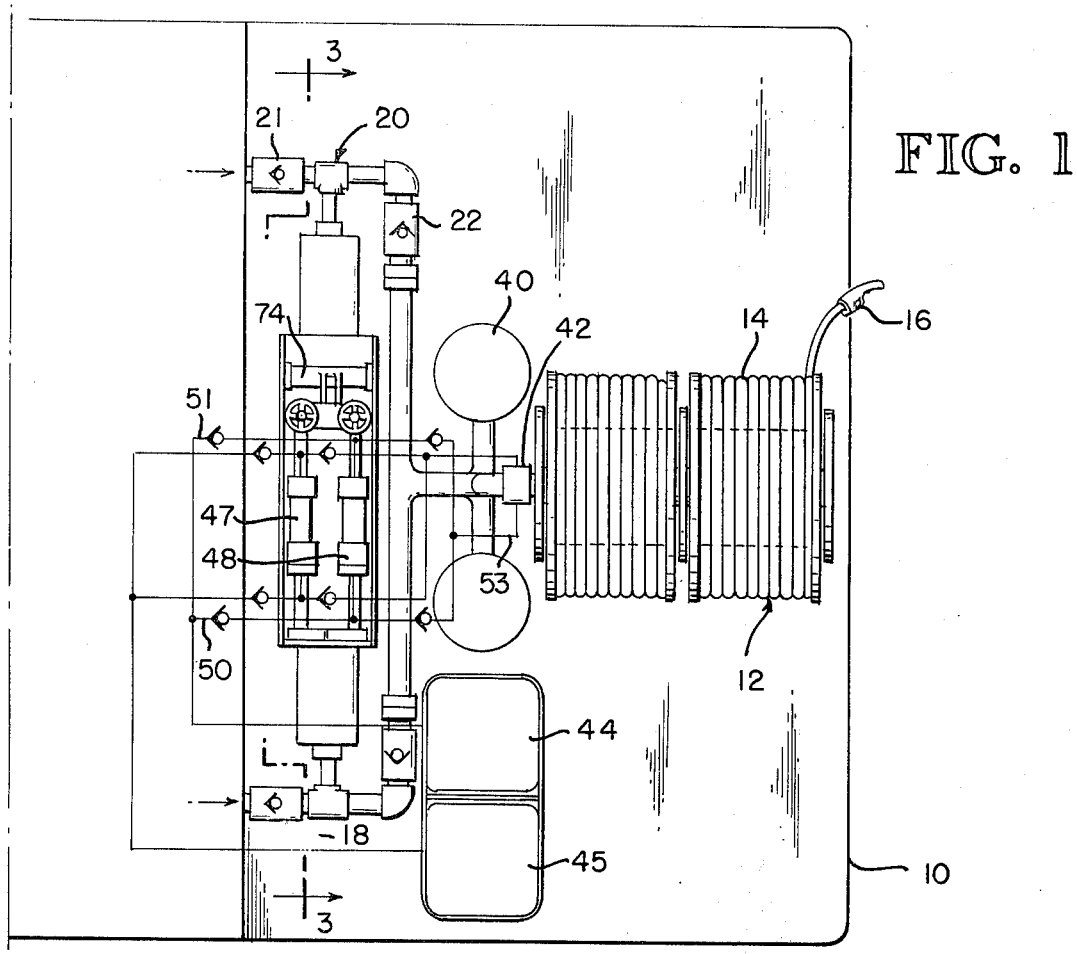
FIG. 1 is a schematic plan of a typical spray-proportioning device embodying the principles of the invention.

As best shown in FIG. 1, the proportioning sprayer device provides a mobile frame 10 on which is mounted a hose reel 12. The hose reel holds a supply of spraying hose 14 terminating in a spray nozzle 16.

Figure 2:
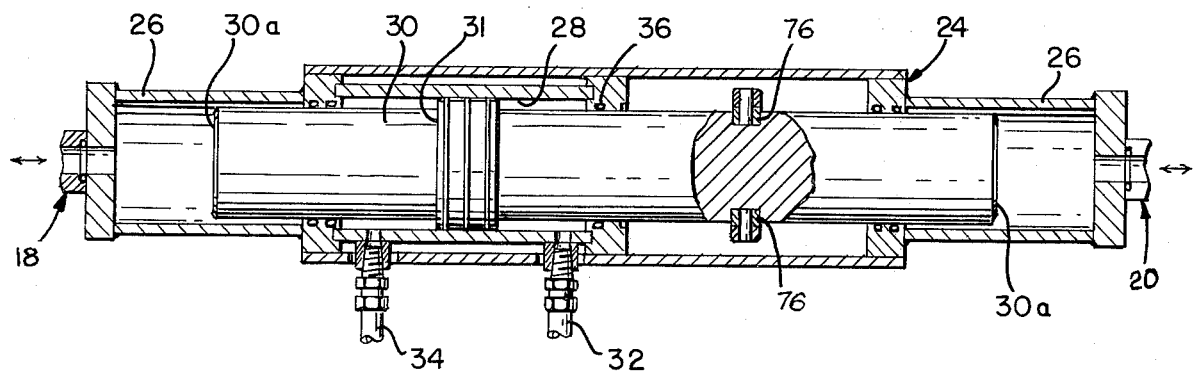
FIG. 2 is a horizontal section taken generally along the line 2—2 of FIG. 3.

Water is supplied from a large tank, not shown, and enters a pair of T-conduits 18 and 20. Each of the T-conduits is provided with an inlet check valve 21 and a discharge check valve 22, as shown in FIG. 1. Mounted between the T-conduits is a main or water piston-cylinder assembly 24. The main piston-cylinder assembly includes a pair of outboard cylinders 26 axially aligned with each other and with a power cylinder 28. Slidably received within the power cylinder is an elongated piston rod 30 having a central piston 31. The piston is reciprocated by pressurized fluid entering or leaving the conduits 32 and 34. Suitable seals 36 retain the fluid within the drive cylinder. The outboard ends of the piston rod 30, as at 30a, are rams or pistons themselves which, when reciprocated in the outboard cylinders 26, alternatively provide suction and positive pressure at the T-conduits 18 and 20. For example, reciprocation of the piston rod 30 will, when traveling from left to right, as viewed in FIG. 2, draw water in through check valve 21 of T-conduit 20. When the direction of the piston rod is reversed, the check valve 21 will block back movement of the water, forcing the water out through check valve 22. Thus the main piston-cylinder assembly is double acting, providing a substantially continuous pulsated flow of water out through the T-conduits.

The T-conduits are directed to a set of conventional pressure accumulators 40 for steadying the pulsating flow to a substantially continuous flow. The substantially uniform flow of water is then directed into a conventional turbulence or mixing chamber 42 in which, through its own velocity or with the addition of a conventional mixing spiral or the like, it is supplied with the additive fluid in a manner to be described. Finally, the mixed water and additive fluid are passed into the hose and out through the nozzle 16.

The additive fluid is supplied from a set of tanks 44 and 45, each of which may contain the same or a different additive fluid. The tanks are separately coupled to additive piston-cylinder assemblies 47 and 48 of identical construction. The conduits between the tanks 44 and 45 and the additive piston-cylinder assemblies are also in the form of T-conduits having check valves on each inlet and discharge side substantially in the same manner as the T-conduits 18 and 20. For brevity of description, only the additive piston-cylinder 47 will be described.

Additive piston-cylinder assembly 48 is coupled to additive tank 44 through a pair of T-conduits 50 and 51 having suitable check valves for providing forward flow only. The conduits are joined at a discharge conduit 53 which enters the mixing chamber 42 in a manner to provide turbulence and mixing with the high-pressure water entering the mixing chamber. Each piston-cylinder assembly is double acting, having a cylinder 56 (FIG. 3) and a piston rod 57. A piston 58 is provided on the piston rod in a conventional manner. Reciprocation of the piston rod is provided through an adjustable linkage 60 mechanically connected to the piston rod 30 of the main piston-cylinder assembly.

The piston rod 57 is provided with a clevis 62 which is pivotally mounted on a threaded trunnion pin 64. Threaded through the trunnion pin is a threaded shaft 66 that is secured to a handle 68. Rotation of the handle 68 turns the threaded shaft 66, which moves the trunnion pin 64 vertically in the linkage 60. The opposite end of the cylinder 56 is pivoted as at 69 to the main piston-cylinder assembly 24. The linkage 60 is pivotally secured to crank support arms 74 which are rigidly fixed to the casing of the main piston-cylinder assembly 24. Slidable shoes 76 ride in slots 77 in the piston rod 30 to allow relative vertical motion. Thus, as is readily apparent, reciprocation of the piston rod 30 will oscillate the clevis 62 of the piston rod 57. The extent of the oscillation determines the stroke of the piston rod. Thus, by rotating the handle 68, the proportionate amount of movement of the piston rod 57 can be obtained with a maximum stroke obtained when the pins 64 are at their lowermost position and a minimum stroke essentially zero when the pins are at their uppermost position, aligned with the upper pivot axis of the linkage 60.

A typical embodiment of the invention has a water pump capacity of 3,000 gph, with pesticide pumps 47 and 48 each having a capacity of 70 gph. Water pressure is 800 psi (max.) Hydraulic oil is delivered at 18.1 gpm at 2215 psi.

Pneumatic, hydraulic or electrical controls can be used to cycle the hydraulic fluid to the piston 31 for reciprocating the piston rod 30. In the preferred embodiment, electrical controls are employed. For this purpose, a set of conventional limit switches LS1 and LS2 are set at opposite ends of the stroke to be contacted by the linkage 60. The limit switches are in a circuit illustrated in FIG. 4. The circuit includes conventional 12 volt lines L1 and L2, a main power switch S1 and a pushbutton recycle switch S2. The limit switches are normally spring-opened. Starting a cycle with the linkage all the way to the left, as viewed in FIG. 3, limit switch LS1 is closed, providing current to relay coil R1. Energization of relay R1 closes normally open contacts R1-1 and R1-2 and opens normally closed contacts R1-3. Closure of contacts R1-1 energizes a solenoid 70. Solenoid 70 then pulls the main four-way, spring-centered, solenoid-operated control valve 73 to the right, as viewed in FIG. 5, to direct pressurized fluid into line 34 to move the piston rod to the right. The piston rod then moves to the right until it causes closing of limit switch LS2. Closing of limit switch LS2 energizes relay coil R2. Energization of relay coil R2 closes contacts R2-1 and R2-3 and opens contacts R2-2. Since at this time limit switch LS1 is open, the opening of contacts R2-2 breaks the circuit to relay R1, thus de-energizing solenoid 70. Simultaneously, the contacts R1-3 are closed to provide a holding circuit to the relay R2. Contacts R2-1 are closed, thus energizing solenoid 72 to draw the four-way valve 73 to the left, as viewed in FIG. 5. Cycling of the piston rod 30 in a reciprocatory motion continues until the circuit is broken as at S1 or until the hydraulic pressure resisting movement of the piston 31 exceeds the setting of the pressure-compensated pump so that pressure is not directed to either of the conduits 34, 32.

The hydraulic power circuit is best illustrated in FIG. 5 and includes a pressure-compensated, variable, positive displacement hydraulic pump 76 of any conventional design having an output connected to a conventional flow control valve 77 and a conventional relief valve 78. Fluid is circulated through a filter 79 back to reservoir 80 to complete the hydraulic circuit.

While the preferred embodiments of the invention have been illustrated and described, it should be understood that variations will be apparent to one skilled in the art without departing from the principles described herein. Accordingly, the invention is not to be limited to the specific embodiment illustrated in the drawing.

The embodiments of the invention in which a particular property or privilege is claimed are defined as follows:

1. A proportioning sprayer device for a mobile vehicle having a main fluid supply and an additive fluid supply, a hose and a spray shut-off nozzle, and main fluid and additive fluid pumping means coupling said supplies to said nozzle, variable volume, constant, pressure positive displacement hydraulic power supplying means powering said pumping means, said pumping means comprising, a main piston powered by said power supplying means, a main fluid supply piston-cylinder assembly having a main fluid piston coupled to said main piston for positively pumping main fluid in response to movement of said main piston and an additive fluid piston-cylinder assembly having an additive piston mechanically and adjustably slaved to said main fluid piston for providing adjustable accurate metering of the additive fluid into the main fluid under control of the shut-off nozzle, said main fluid piston-cylinder assembly including a main rod, said additive fluid piston-cylinder assembly including pivot arm means slidably coupled to said main rod for oscillation with said main rod about a fixed pivot axis, an additive rod coupled to said additive piston, said additive rod having a free end, means adjustably coupling the free end of said additive rod to said pivot arm means for movement toward and away from said fixed pivot axis, said adjustable coupling means including a screw, a threaded bracket on said screw coupled to said additive rod free end and moveable along said screw toward and away from said pivot axis, and handle means on the end of said screw opposite said end of said pivot arm means which is slidably coupled to said main rod for turning the screw to cause movement of said bracket, whereby reciprocation of said additive rod occurs in response to oscillation of said pivot arm means which reciprocation can be easily varied by said handle moving said screw to vary the distance between the fixed pivot axis and the free end of the additive rod to vary the proportions of additive fluid to main fluid.

2. The device of claim 1, said piston-cylinder assemblies each having a double cylinder for pumping during both directions of movement of said pistons.

3. The device of claim 1, said pumping means including reciprocation regulating means for cycling the piston-cylinder assemblies during each stroke.

4. The device of claim 3, said regulating means including a four-way, spring centered, solenoid operated control valve for directing flow from said power pump selectively to opposite sides of said main piston, and switch means for signalling said solenoid operated control valve at the end of each stroke of said main piston.

5. The device of claim 1, said hydraulic power supplying means including a pressure-compensated, positive-displacement power pump.

* * * * *